United States Patent [19]

Davies et al.

[11] Patent Number: 5,486,499
[45] Date of Patent: Jan. 23, 1996

[54] PILLARED CLAYS

[75] Inventors: Mary E. Davies; Mavis E. Whittle, both of Cheshire; William Jones; Robert Mokaya, both of Cambridge, all of England

[73] Assignee: Laporte Industries Limited, England

[21] Appl. No.: 140,007

[22] PCT Filed: Apr. 13, 1992

[86] PCT No.: PCT/GB92/00674

§ 371 Date: Feb. 3, 1993

§ 102(e) Date: Feb. 3, 1993

[87] PCT Pub. No.: WO92/19533

PCT Pub. Date: Nov. 12, 1992

[30] Foreign Application Priority Data

Apr. 24, 1991 [GB] United Kingdom .................. 9108771

[51] Int. Cl.$^6$ ..................................................... B01J 21/16
[52] U.S. Cl. .................................. 502/81; 502/84
[58] Field of Search .......................... 502/81, 84

[56] References Cited

U.S. PATENT DOCUMENTS

| | | | |
|---|---|---|---|
| 4,176,090 | 11/1979 | Vaughan et al. | 502/84 |
| 4,216,188 | 8/1980 | Shabrai et al. | 423/118 |
| 4,238,364 | 12/1980 | Shabtai | 502/65 |
| 4,299,730 | 11/1981 | Sommer et al. | 502/81 |
| 4,515,901 | 5/1985 | Elattar | 502/63 |
| 4,766,099 | 8/1988 | Dufresne et al. | 502/84 |
| 4,775,461 | 10/1988 | Harris et al. | 502/84 |
| 5,087,598 | 2/1992 | Suzuki et al. | 502/84 |
| 5,137,707 | 8/1992 | Aufdembrink et al. | 502/81 |
| 5,308,812 | 5/1994 | Salem et al. | 502/84 |

FOREIGN PATENT DOCUMENTS 1432770  4/1976  United Kingdom .

OTHER PUBLICATIONS

D. R. Taylor et al., "Bleaching with Alternative Layered Minerals: A Comparison With Acid–Activated Montmorillonite for Bleaching Soybean Oil", JAOCS, vol. 66, No. 3, Mar. 1989.

Derwent Publications Ltd., London, GB May 22, 1990 (Abstract only).

*Primary Examiner*—Asok Pal
*Attorney, Agent, or Firm*—Klauber & Jackson

[57] ABSTRACT

A process for the production of an adsorbent suitable for use in the purification of edible oils such as soya oil comprising treating a layered clay mineral with a solution of a pillaring material such as a suitable aluminium cation so as to cause the adsorption of at least some of the pillaring material into the clay mineral and removing solvent to deposit pillaring material within the clay mineral, the process being characterised by the removal of at least some structural aluminium from the clay mineral by an acid treatment prior to contact with the pillaring material. The resulting pillared material, which can have a higher $SiO_2:Al_2O_3$ ratio than normal as a result of the initial acid treatment can give chlorophyll adsorption capacity above 70% and even, in some instances, up to about 99%.

22 Claims, 2 Drawing Sheets

PILLARED CLAYS

BACKGROUND OF THE INVENTION

This invention relates to pillared clays, to their production and to their use.

Edible oils such as vegetable, animal or fish oils generally contain a variety of constituents which detract from their stability, appearance, taste or smell or which may represent a health hazard for consumers. Examples of such impurities are pigments such as the carotenoids or the chlorophylls, phosphorus compounds such as the phospholipids or phosphatides, and polyaromatic hydrocarbons such as benzo(a)pyrene. Some of these impurities, for example polyaromatic hydrocarbons or porphyrin-type materials such as chlorophyll, have relatively large molecular dimensions which can hinder their removal from oil or other liquids by adsorption onto a solid removable adsorbent material.

Pillared clays, while in general possessing desirable molecular sieve charcteristics as adsorbents, show relatively poor ability to adsorb porphyrin-type molecules from oils. The present invention relates more specifically, however, to pillared clays which show substantial ability to adsorb such molecules from oils, to a method for producing such pillared clays and to a process for the purification of oils using such pillared clays.

The removal of chlorophyll or other impurities from soyabean oil using acid activated montmorillonite is discussed by D. R. Taylor et al in a paper published in JAOCS, Vol 66, No. 3, March 1989. In that paper pillared montmorillonite produced from non-acid-activated clays was shown to have a low activity, in the adsorption of chlorphyll. On treatment of the already pillared clay with sulphuric acid the chlorophyll removal activity decreased still further.

It has now been found that pillared clays produced by introducing pillars into a previously acid-activated clay can be effective adsorbents for use in oil purification, and can show a substantial ability to remove chlorophyll from the oils.

SUMMARY OF THE INVENTION

The present invention therefore provides a process for the production of an adsorbent suitable for use in the purification of edible oils comprising treating a layered clay mineral with a solution of a pillaring material so as to cause the adsorption of at least some of the pillaring material into the clay mineral and removing solvent to deposit pillaring material within the clay mineral, the process being characterised by the removal of at least some structural aluminium from the clay mineral by an acid treatment prior to contact with the pillaring material.

BRIEF DESCRIPTION OF DRAWINGS

In the drawings appended hereto:

FIG. 1 shows the results of adding the clay to the reagent at 20° C. followed by reaction for one hour at 20° C.

FIG. 2 shows the results of adding the clay to the reagent at 80° C. followed by reaction for one hour at 80° C.

FIG. 3 shows the results of adding the clay to the chlorohydrate solution which had been aged at 80° C. for one hour and then allowed to cool to 20° C. The clay was added and reacted at 20° C. for one hour.

FIG. 4 shows the results of adding the clay to the chlorohydrate solution which had been aged at 80° C. for one hour. The clay was added and reacted at 80° C. for one hour.

DETAILED DESCRIPTION OF THE INVENTION

Figure 1:
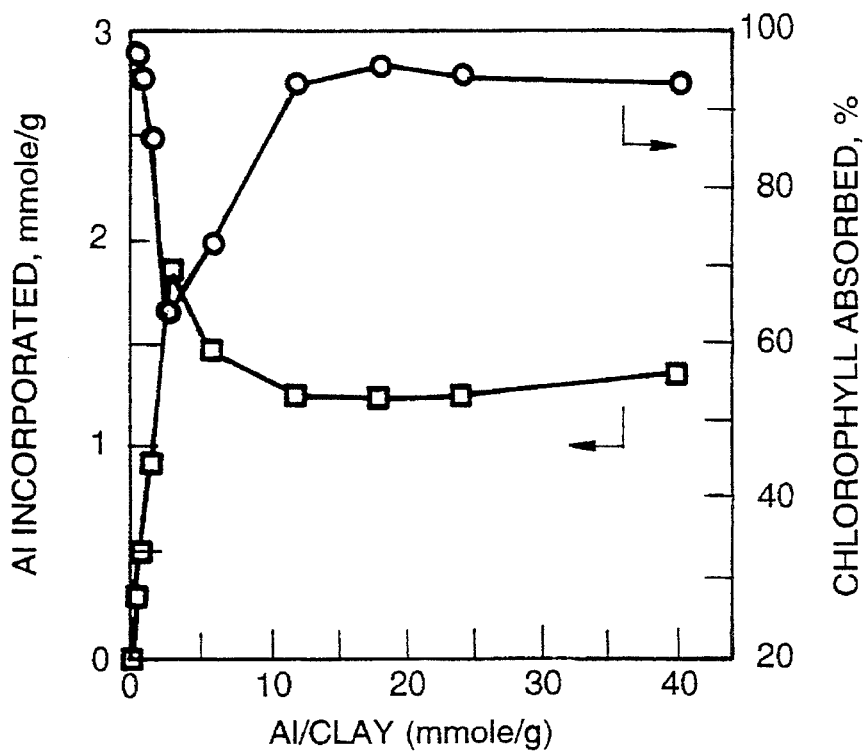
FIGS. 1 to 4 show the amount of chlorophyll adsorbed (%) and the amount of aluminium incorporated in the pillared clay against the aluminium/clay ratio, each in mole/g of pillared clay using different reaction conditions.

Preferably the layered clay mineral used as the basis for the adsorbent of the present invention is a swellable smectite clay mineral for example, preferably, a montmorillonite. Synthetic analogues of smectite clay minerals such as the synthetic hectorite produced according to the process described in UK Patent Specification No. 1432770 and available from Laporte Industries Limited under the Trade Name Laponite, may also be used. Non-smectite clays which may have suitable swelling properties such as suitable members of the kaolin group of minerals or mixed layer clay minerals are not excluded from the ambit of the present invention. Preferably the swellable clay is capable of expanding in water to give an interlayer spacing of at least 5A.

The acid-treatment has a fundamental effect on the structure of layered clay minerals as well as causing the partial or complete replacement of calcium, or sodium interlayer cations by hydrogen cations. The smectite minerals, for example, have a layered structure composed of octahedral alumina sheets containing restricted proportions of other structural constituents bonded via shared —O— bonds to adjacent tetrahedral silica sheets to form clay platelets the crystallographic repeat distance or basal spacing of which is of the order of 10 Angstroms in the dry clay mineral and somewhat increased in the water-wet clay mineral. When a layered clay mineral is treated with a strong acid, i.e. an acid having a pKa value below 3.0, for example a mineral acid such as sulphuric acid, nitric acid or hydrochloric acid or an organic acid such as formic acid or oxalic acid, the alumina layer is attacked at the platelet edges to leach out some aluminium and other octahedral constituents and to generate pores having a diameter in excess of 15 Angstroms, usually from 20 to 50 Angstroms, in the platelets. As the severity of the acid treatment increases the clay mineral structure may be envisaged to be increasingly converted into one in which octahedral aluminium is increasingly removed at the clay platelet edges. This may be expected to give a relatively open structure with a wide pore size distribution and, very importantly, due to the exposure of structural acidic sites, a relatively high acidity.

The silicon content of a natural clay mineral, such as a smectite, calculated as $SiO_2$, may be in the region of about 50 to 55% by weight and its $SiO_2/Al_{O3}$ ratio may be under 7.0. An effect of acid-treatment according to the invention is to increase the overall content of silicon in the acid-treated product as an increasing proportion of the aluminium and other octahedral constituents are leached out and removed by washing in the form of soluble salts. The silica/alumina ($SiO_2/Al_2O_3$) ratio may be increased as a result of this by more than 10%, usually more than 20% for example from about 6–7 to about 8–10.

The acid treatment according to the invention may be accomplished by digesting the clay mineral in a strongly acidic aqueous slurry. The acid-treatment may be controlled, for example, by controlling the duration, temperature, pressure or acid concentration utilised in the acid-treatment. The acid is suitably a strong mineral acid, preferably sulphuric acid, which may have an initial concentration of, for example, 77 to 100% by weight and a concentration in the aqueous slurry of about 10 to 40%, preferably 15 to 30% by weight. An acid:clay ratio of from 0.25 to 1.5 by weight, calculated as 100% acid, is preferably used. The digestion may be conducted for from about 5 to 25 hours, preferably 10 to 16 hours if atmospheric pressure digestion is used or from 1 to 8 hours when pressure digestion is used. Pressure digestion may suitably be conducted at a pressure of up to about 200 psig (about 13.5 bars) but preferably of up to about 150 psig (about 10 bars) and is preferably conducted at a temperature suitable to generate the required pressure. Atmospheric pressure digestion may suitably be conducted at a temperature of about 70° to 100° C. preferably about 85° to <100° C. The digestion may be terminated at the desired point by quenching with cold water after which the slurry of acid-treated clay mineral may be pumped to a suitable filter press where it may be water-washed and dried as desired.

The acid treated clay mineral produced as above described may have a particle size approximately in the >10 micron size range.

Normally a clay intended for pillaring is ground to contain a major proportion by weight of particles below 2 microns in diameter. While this is preferred it is not essential according to the invention.

Any source of inorganic pillars may be utilised according to the present invention. Preferably, however, the pillaring material comprises water soluble aluminium, zirconium, chromium or titanium cations or mixtures of two or more of these. Such cations may be produced by forming a metal hydroxide or halohydroxide solution and allowing it to age. U.S. Pat. Nos. 4,216,188 and 4,176,090 describes the preparation and use of aluminium hydroxide and chromium hydroxide cations to "cross-link" or pillar montmorillonite clays although the clays are in or are first converted to the monosodium or monolithium form. U.S. Pat. No. 4176090 describes the preparation and similar use of aluminium, zirconium or titanium cations. The disclosure of these two patents in respect of the manufacture of these cations is incorporated herein by reference. Preferably the pillaring material is an aluminium cation.

Two factors which affect the ability of the acid-activated pillared clay to adsorb chlorophyll are the amount of aluminium or other pillaring cation incorporated into the pillared clay which in turn is dependent on the aluminium (or other pillaring cation) to clay ratio, and the degree of polymerisation of the pillaring cations. The latter property may be monitored by the use of NMR techniques which in the case of aluminium as the pillaring species reveals the existence of the monomer $[Al(OH_2)_6]^{3+}$ species, and the oligmeric or polymeric $[Al_2(H_2O)_8(OH_2)]^{4+}$ and $[AlO_4Al_{12}(H_2O)_{12}(OH_2)_4]^{7+}$ species. The degree of polymerisation is affected by the concentration of the pillaring solution, with the $Al_{13}^{7+}$ species being encouraged by an increasing concentration. The effect of an increasing concentration of pillaring cation on chlorophyll adsorption is adverse in respect of its consequence of increasing the amount of pillaring species adsorbed and favourable in respect of its encouragement of the presence of polymerised species. Where there has been no pre-ageing of the pillaring solution these effects are marked and result in a preference to avoid a certain range of pillaring species to clay concentrations. Preferably, for unaged solutions, the concentration is from 0.4M Al (or other pillaring species) and/or the pillaring species to clay ratio is from 0.004 to 0.4 mmole Al (or other pillaring species)/g. Preferably the said ratio is not from greater than 0.4 to 10 m.mole Al/g. Higher ratios than 10 m.mole Al/g may be used but gives no benefit, or in fact a worsening of performance, over the preferred range. Where the pillaring cation has been aged these effects are less marked and on an economy basis the pillaring cation to clay ratio is preferably maintained below 10 m.moles Al/g. The effect of pillaring is to decrease the $SiO_2:Al_2O_3$ or the $SiO_2:(Al_2O_3 +$ other pillaring species) where the pillaring species is other than aluminium, for example to below 6 suitably to from about 3 to 5.

A suitable aluminium pillaring cation may preferably be prepared from an aqueous solution of aluminium halohydrate, preferably chlorohydrate. Preferably the aluminium halohydrate may be aged for, for example from 20 minutes to 30 hours at temperature which may suitably be from 20° C., but are preferably at least 40° C., up to the boiling point. Preferably the aging is at superambient temperature. Examples of suitable ageing conditions are heating at 80° C. for 1 hour or storing at room temperature for up to 24 hours or intermediate temperature/time combinations. The pH of the halohydrate solution is suitably maintained in the acidic range, suitably selected below 6.0. It is found to be helpful to maximise the oligomerisation of the aluminium compounds to stabilise the aluminium halohydrate from decomposition by the addition of a stabilising agent such as sodium acetate, sugars such as the aldohexoses, aldonic acid or aldonolactones, for example glucose, mannose or galactose, the corresponding acids or lactones, or the dibasic hydroxy acids such as citric acid, tartaric acid or malic acid. A suitable quantity of stabiliser would be at least 0.5% and up to 5% or more by weight of the aluminium in the aluminium hydroxide oligomer calculated as $Al_2O_3$. The above procedures and conditions may have to be varied appropriately for the preparation of other pillaring cations.

The cation may be modified by the inclusion in the preparation thereof, in substitution of some of the aluminium hydroxide or halohydroxide, of one or more of the hydroxides or halohydroxides of the alternative metals identified above. Alternatively an analogous method may be employed to produce suitable cations of these metals or of mixtures of them, in the absence of aluminium hydroxide or chlorhydroxide. The cations may be further modified by including ions of other metals in the form of a soluble salt with the aqueous solution of the hydroxide or halohydrate. These other metal, or metals, may be selected from, but not limited to the transition elements, silicon, gallium, germanium, phosphorus or arsenic.

The treatment of the clay with the pillaring solution may be conducted by forming a dispersion of the clay in the pillaring solution and maintaining that dispersion until intercalation has occurred to a sufficient degree, for example for from 30 minutes to 5 hours. This may be accomplished either by first dispersing the clay and adding the pillaring solution to it or by dispersing the clay directly in the pillaring solution.

It is found that the control of the pillaring process in one or more of the following respects gives an improved performance in relation to chlorophyll adsorption.

The contact of the acid-treated clay with the solution of pillaring species which may be conducted at any temperature, even above the boiling point if pressure is used, or more suitably at from 10° to 90° C., may preferably be conducted at below 50° C., particularly preferably below 35° C., for example at from 10° to 30° C. This is particularly appropriate if the pillaring species is an aluminium hydroxide cation.

The slurry of the acid-activated clay after treatment with pillaring material may suitably be filtered and repeatedly washed in deionised water, for example in a centrifuge, until free of chloride ions. The washed solids so obtained may be redispersed according to the invention and dried. The drying regime is found to be important in that, while air drying may be employed, freeze drying or film drying may enhance the chlorohyll adsorption efficacy of the product, particularly where an aluminium hydroxide cation has been used to pillar the clay. The freeze drying process is very suitably conducted over a period of from 1–5, preferably 2–4, days. Depending on the pillaring species, and on other considerations, other forms of drying may be preferred in certain circumstances.

To convert the pillar precursors to the oxide form the dried product may be heated in air at, for example, from about 250° to about 650° C. but preferably from 250° to 400° C. This control of the heating temperature can give a small but appreciable improvement in properties. The efficacy of the pillared clay may also be improved by ion-exchange with an acidic cation such as, for example, $Al^{+3}$, $Cr^{3+}$, $Fe^{3+}$ $Ti^{4+}$ or $H^+$. This has the effect of redressing the loss of surface acidity of the original acid treated clay resulting from the blocking or removal of acidic sites by pillars, at least to some extent. As a result of the combination of using an acid-treated clay and ion exchange with an acidic species the ion-exchanged pillared clay preferably has a surface acidity of at least 0.2 as determined at a pKa value of −1.5 using a Hammett indicator and expressed as m.eq. n-butylamine per gram dry weight of the ion exchanged pillared clay. Particularly preferably the surface acidity, on the same basis, is at least 0.25 and up to, for example, 0.6. The cation exchange may be performed by immersing the pillared clay in a solution of a compound supplying the cation in question, for example the chloride, after which the pillared clay may be removed, washed in deionised water and dried. The pillared clay may preferably have a $SiO_2/Al_2O_3$ ratio, or silica/other pillaring species + $Al_2O_3$ ratio, below 5.0.

Oils or other liquids may be treated with the adsorbent product of this invention in any suitable manner, for example by passing the oil in neat form or in the form of a solution or micellar suspension in a suitable polar medium through a bed of the adsorbent or by placing a quantity of the adsorbent in a body of the oil, allowing adsorption of at least some impurities from the oil into the adsorbent, and removing the adsorbent from the oil. Using the adsorbent of the invention a chlorophyll adsorption capacity of above 70% and even up to above 99% may be obtained. By suitably controlling its production process a chlorophyll adsorption capacity above 90% may be achieved consistently.

EXAMPLES

The invention will now be more specifically illustrated by reference to the following Examples.

In the experiments described in the Examples a series of products was produced using varying production conditions. Certain physical features of the products and their efficacy in removing chlorophyll from an oil were measured. Examples 5 to 8 inclusive are according to the invention and Examples 1 to 4 are not according to the invention but are present for comparative purposes.

A natural calcium montmorillonite clay mineral having an $SiO_2$ content of 55.6% and an $SiO_2/Al_2O_3$ ratio of 6.7 was used as the starting material. This clay was treated with sulphuric acid having a concentration of 98% w/w at an acid/earth weight ratio of 0.30 calculated as 100% acid at 90°–100° C. for 16 hours. The clay was then removed from the acid, washed in demineralised water to remove soluble metal salts formed in the course of the acid treatment, and air dried at 110° C. The acid treated clay had a $SiO_2$ content of 58.1% and a $SiO_2/Al_2O_3$ ratio of 9.1.

The precursor-pillared samples were prepared by adding the acid-activated montmorillonite to a stirred aluminium chlorohydrate solution the concentrations of which varied between 0.004M and 0.4M Al. The clay was added to the solutions at a solution/clay ratio of 50 ml/g corresponding to Al/clay ratios in the range 0.4 mmole/g to 40 mmole/g. The exchange was then carried out for 1 hr with constant stirring. The resulting slurry was repeatedly centrifuged in fresh de-ionised water and reslurried until free of $Cl^-$ ions (as tested by $AgNO_3$). The obtained solids were then redispersed in a minimum amount of de-ionised water and air-dried to obtain the precursor pillared clays. The samples were calcined by heating the precursor materials in air at 500° C.

Four series of materials were prepared:

1. Series A: The clay was added to the reagent at 20° C. and reacted for 1 hr at 20° C.
2. Series B: The clay was added to the reagent at 80° C. and reacted at 80° C. for 1 hr at.
3. Series C: The chlorohydrate solution was aged at 80° C. for 1 hour, the mixture was then allowed to cool to 20° C. The clay was then added and reacted at 20° C. for 1 hr.
4. Series D: The chlorohyrate solution was aged at 80° C. for 1 hr. The clay was then added to the reagent and reacted at 80° C. for 1 hr.

Determinations of chlorophyll adsorption capacity were made by adding a known amount of the pillared clay to superdegummed rapeseed oil containing 8000 parts per billion ($10^9$) of chlorophyll and having a temperature of 100° C. After stirring for 35 minutes the absorbent was filtered off and the amount of residual chlorophyll was measured colourometrically.

Figure 2:
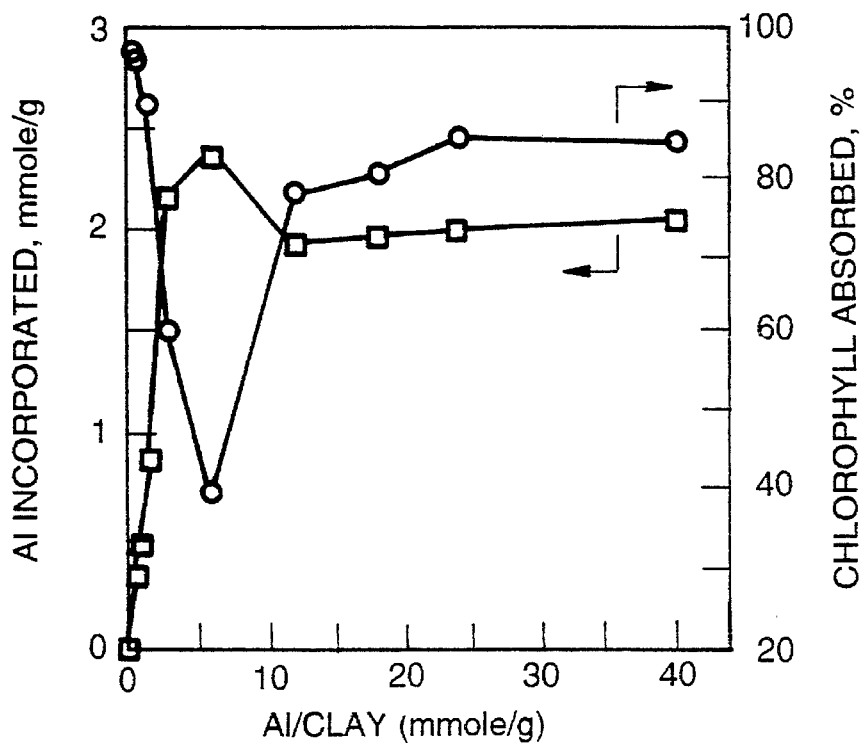
Figure 3:
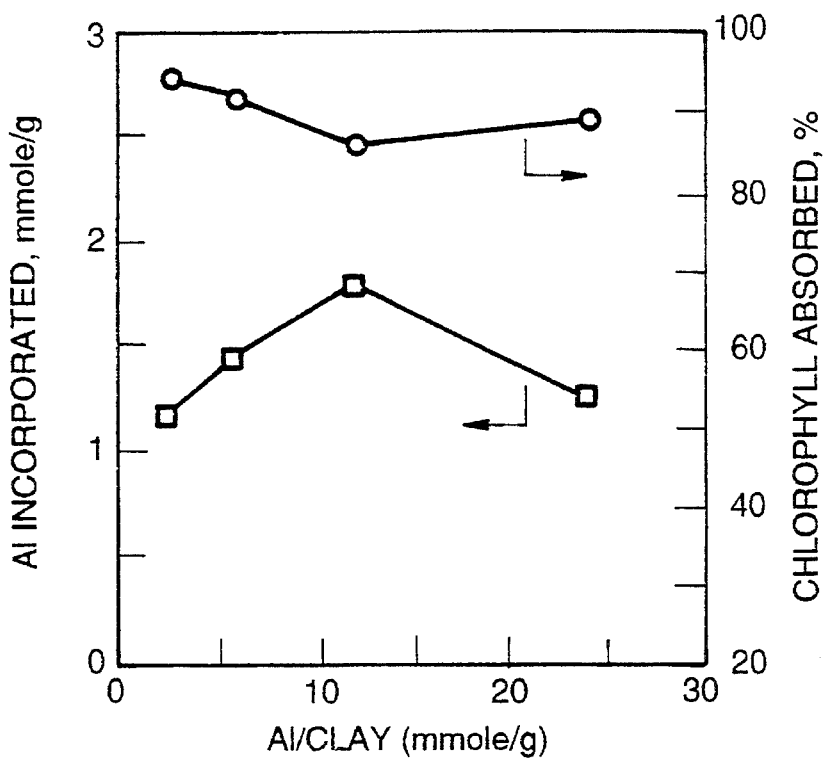
Figure 4:
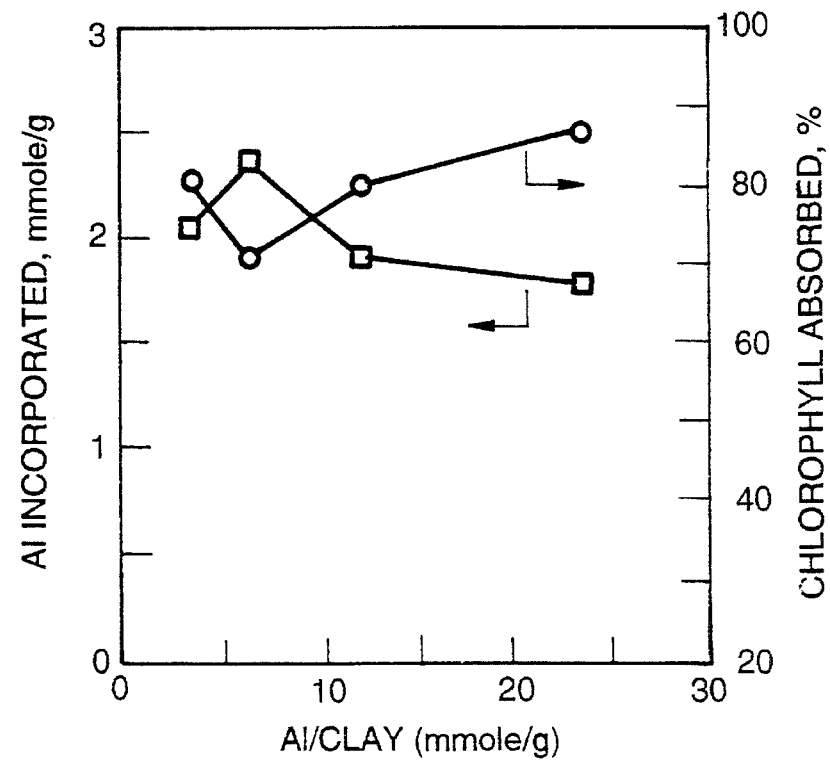

For Series A to D the amount of chlorophyll adsorbed (%) and the amount of aluminium incorporated in the pillared clay were plotted against the aluminium/clay ratio, each in mmole/g of pillared clay to give the plots depicted in FIGS. 1 to 4 respectively.

In a further series of experiments comprising Examples 1 to 8 similar conditions were used to produce the acid-activated clay. To provide comparative data some samples of clay were not acid activated.

The pillaring solution was an aqueous solution of the chlorohydrate of about 50% w/w calculated as the dihydrate, an OH/Al ratio of 2.5 and a concentration of aluminium of about 6.4 molar. Unless otherwise stated the chlorohydrate solution had not been aged.

To produce a pillared product the clay was added to the pillaring solution at a relatively high aluminium/clay ratio of 6 m mole/g. The mixture was stirred at either 20° C. or 80° C. for 1 hour. The mixture was then centrifuged and reslurried in fresh deionised water until the supernatant liquor was free of chloride ions. The solids so obtained were either air dried or freeze dried to obtain pillar precursors. In some instances these were converted to pillars by heating at 300° C. or 500° C.

The materials tested are indicated by the following references.

| | | |
|---|---|---|
| PM | Montmorillonite treated with pillaring material and dried but not calcined. | |
| CPM | Calcined PM. | |
| PAM | Acid-activated montmorillonite treated with pillaring material and dried but not calcined. | |
| CPAM | Calcined PAM. | |
| (20) or (80) | Temperature (°C.) of pillaring. | |
| FD | Freeze dried | |
| AD | Air dried | |

The surface area, pore volume, average pore diameter and surface acidity of the materials were determined by standard means and is set out in the following Table.

| Ex. No. | BET S.A. (m2/g) | | Pore Vol (cc/g) | | Av. Pore Diam. Angstroms | | Surface Acidity |
|---|---|---|---|---|---|---|---|
| | FD | AD | FD | AD | FD | AD | AD |
| 1 PM(20) | 103 | 188 | 0.11 | 0.15 | 29.8 | 24.5 | 0.09 |
| 2 PM(80) | 204 | 188 | 0.15 | 0.14 | 22.2 | 21.0 | 0.05 |
| 3 CPM(20) | 200 | 172 | 0.18 | 0.17 | 27.0 | 28.9 | 0.10 |
| 4 CPM(80) | 293 | 270 | 0.21 | 0.19 | 21.0 | 20.3 | 0.06 |
| 5 PAM(20) | 223 | 191 | 0.31 | 0.27 | 40.3 | 38.9 | 0.32 |
| 6 PAM(80) | 121 | 87 | 0.20 | 0.16 | 45.7 | 42.0 | 0.18 |
| 7 CPAM(20) | 284 | 322 | 0.38 | 0.37 | 38.6 | 34.2 | 0.30 |
| 8 CPAM(80) | 259 | 257 | 0.30 | 0.29 | 33.8 | 32.5 | 0.19 |

The calcination temperature for CPM and CPAM was 500° C. Surface acidity was measured using Hammett indicators at a pKa value of −1.5 and expressed as m.eq. n-butylamine/g. BET SA means surface area (B.E.T. method).

It can be seen from the above figures that acid-activated montmorillonites can be pillared to give calcined pillared clays with surface areas in the range 250–320 m²/g, pore volumes in the range 0.3–0.38 cc/g and average pore diameters in the range 25–35A. The nature of the final product is influenced by the aging of the pillaring material, the temperature of pillaring, the method of drying, the temperature of calcination and the ion exchange of the pillared clays with acidic species.

The greater pore diameter, pore volume and surface acidity of pillared acid-activated clays would also make them potentially useful in processes that require these properties, e.g. catalysis and adsorption processes in general.

As a test of the ability of pillared clays, calcined at 500° C. and made using unaged pillaring solution unless otherwise stated, to adsorb chlorphyll from oil a standard amount of the pillared clay was added to superdegummed rapeseed oil containing 8000 ppb chlorophyll and held at 100° C. for 35 minutes. (ppb=parts per billion [$10^9$])'

| | Chlorophyll adsorption (% adsorbed) | | | | |
|---|---|---|---|---|---|
| Ex No. | A FD | B AD | c FD | D AD | E AD |
| 1 PM(20) | 6.4 | 3.2 | | | |
| 2 PM(80) | 6.6 | 1.7 | | | |
| 3 CPK(20) | 5.5 | 3.4 | 7.2 | 4.6 | |
| 4 CPM(80) | 7.3 | 2.6 | 6.9 | 3.6 | |
| 5 PAM(20) | 69.5 | 64.0 | | | |
| 6 PAM(80) | 27.9 | 21.4 | | | 23.6 |
| 7 CPAM(20) | 74.1 | 73.2 | 75.9 | 73.9 | |
| 8 CPAM(80) | 45.0 | 34.7 | 42.9 | 40.6 | 37.2 |

In Examples 3, 4, 7 and 8 the pillared materials were calcined at 500° C. for tests A and B but at 300° C. for tests C and D. In Examples 6 and 8, tests E, the chlorohydrate used to produce the pillared material had been aged for 24 hours, whereas in all the remaining tests it had not been aged.

When CPAM(80) (AD) calcined at 500° C. was cooled in an aqueous ammonical solution, its chlorophyll adsorption dipped from 34.7 to 9.4%. When it was then ion exchanged with $Al^{3+}$ ions, as an example of an acidic cation, by immersing in a 1.0N solution of aluminium chloride for 24 hours with stirring followed by washing free of $Cl^-$ ions with deionised water, the chlorophyll adsorption figure increased to 71.7%. The equivalent $Al^{3+}$ exchanged CPAM(20) (AD) figure was 84.4%. However, when CPAM(20) (AD) was ion exchanged with $Al^{3+}$ ions without first cooling in aqueous ammonia the chlorophyll adsorption figure was 88.5%. A beneficial effect obtained by aging the pillaring species is also seen from tile above figures.

While the utility for the products of the invention envisaged above is in purifying oils the special nature of these products resulting from their derivation from acid-activated clays, such as their increased pore volume, average pore diameter and surface acidity, make them particularly adapted to use as catalysts, in a final metal exchanged form/and catalyst supports for the metals nickel, zinc, copper, molybdenum, cobalt, tungsten, platinum, rhodium, palladium or other catalytic metals in applications which include: hydrocracking; hydrotreating (hydrode-sulphurization); hydrogenation; dehydrogenation; alkylation; polymerization; isomerization; esterification; condensation; hydrolysis; demetallization; visbreaking; catalytic reforming.

We claim:

1. A process for the production of a material suitable for use in the purification of edible oils or as a catalyst support the process comprising treating a layered clay mineral comprising structural aluminum and silicon with a solution of a pillaring material so as to cause adsorption of at least some of the pillaring material into the clay mineral and removing solvent to deposit pillaring material within the clay mineral the process being characterized by acid treating the clay mineral, prior to contact with the pillaring material, at a temperature of at least 70° C. with acid at a concentration of at least 10% by weight so as to increase the silica to alumina ratio in the clay mineral by at least 10% by the removal of structural aluminum.

2. A process as claimed in claim 1 wherein the clay mineral is a swellable smectite clay mineral.

3. A process as claimed in claim 1 wherein the acid treatment is conducted under conditions which cause an increase in the silica/alumina ratio of the clay mineral.

4. A process as claimed in claim 1 wherein the acid treatment is conducted under conditions which generate at least some pores having a diameter in excess of 15 Angstroms in the clay mineral platelets.

5. A process a claimed in claim 1 wherein the pillaring material is an aluminium cationic material.

6. A process as claimed in claim 1 wherein the pillaring is conducted by treating the acid activated clay with an unaged solution of a cationic pillaring compound having a concentration of from 0.004 molar to 0.4 molar or greater than 10 molar.

7. A process as claimed in claim 5 wherein the solution of pillaring material is aged before being brought into contact with the clay.

8. A process as claimed in claim 1 wherein the acid: clay ratio is at least about 0.25 by weight.

9. A process as claimed in claim 1 wherein the pillaring is conducted using an aluminium/acid-activated clay ratio of 0.004 to 0.4 m.mole/g.

10. A process as claimed in claim 5 wherein the pillaring stage of the process is conducted so as to decrease the $SiO_2/X$ ratio to below 5.0 where X represents $Al_2O_3$ or other pillaring species $+Al_2O_3$.

11. A process as claimed in claim 1 wherein the clay mineral containing adsorbed pillaring material is heated at from 250° C. to 500° C. to stabilise said pillaring material.

12. A process as claimed in claim 1 wherein the pillared clay mineral is ion-exchanged with an acidic cation to increase its surface acidity, determined at a pKA value of −1.5 using a Hammett indicator, of at least 0.25.

13. An acid treated smectite clay mineral pillared with a cationic pillaring material having a pore volume of at least 0.20 g/cc, an average pore diameter of at least 30 Angstroms and a surface acidity greater than 0.10.

14. An acid-treated smectite clay mineral pillared with a cationic pillaring material and ion-exchanged with an acidic cation to give a surface acidity, determined at a pKA value of −1.5 using a Hammett indicator, of from 2.5 to 6.5.

15. A clay mineral as claimed in claim 14 wherein the pillaring material is a cationic aluminium compound and the acidic cation is the $Al^{3+}$ cation.

16. A clay mineral as claimed in claim 13 having a chlorophyll adsorption capacity of above 90%.

17. A process for the purification of an oil comprising contacting the oil with a pillared clay mineral which has been produced by the process of claim 1, to allow adsorption of impurities onto the clay mineral and thereafter removing the clay mineral from the oil.

18. An oil purification adsorbent or a catalyst support comprising the acid treated clay mineral claimed in claim 13.

19. A process as claimed in claim 2, wherein the acid treatment is conducted under conditions which cause an increase in the silica/alumina ratio of the clay mineral.

20. A clay mineral as claimed in claim 14 having a chlorophyll adsorption capacity of above 90%.

21. A process for the purification of an oil comprising contacting the oil with an acid treated smectite clay mineral pillared with a cationic pillaring material having a pore volume of at least 0.20 g/cc, an average pore diameter of at least 30 Angstroms and a surface acidity greater than 0.10, to allow adsorption of impurities onto the clay mineral and thereafter removing the clay mineral from the oil.

22. A process for the purification of an oil comprising contacting the oil with an acid-treated smectite clay mineral pillared with a cationic pillaring material and ion-exchanged with an acidic cation to give a surface acidity, determined at a pKA value of −1.5 using a Hammett indicator, of from 2.5 to 6.5, to allow adsorption of impurities onto the clay mineral and thereafter removing the clay mineral from the oil.

* * * * *